(12) United States Patent
Line et al.

(10) Patent No.: US 9,566,930 B2
(45) Date of Patent: Feb. 14, 2017

(54) VEHICLE SEAT ASSEMBLY WITH SIDE-IMPACT AIRBAG DEPLOYMENT MECHANISM

(71) Applicant: Ford Global Technologies, LLC, Dearborn, MI (US)

(72) Inventors: Johnathan Andrew Line, Northville, MI (US); Marc Silva Kondrad, Macomb, MI (US); Brett Ronzi, Highland, MI (US); Christian J. Hosbach, Taylor, MI (US); Keith Allen Godin, Dearborn, MI (US); David Frederick Lyons, Jr., New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/635,025

(22) Filed: Mar. 2, 2015

(65) Prior Publication Data
US 2016/0257276 A1    Sep. 8, 2016

(51) Int. Cl.
*B60R 21/207* (2006.01)
*B60N 2/68* (2006.01)
(Continued)

(52) U.S. Cl.
CPC .............. *B60R 21/207* (2013.01); *B60N 2/68* (2013.01); *B60R 21/215* (2013.01); *B60R 21/23138* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS 2,958,369 A   11/1960 Pitts et al.
3,403,938 A   10/1968 Cramer et al.
(Continued)

FOREIGN PATENT DOCUMENTS

EP    0754590    1/1997
EP    0926969    1/2002
(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — James English
(74) *Attorney, Agent, or Firm* — Vichit Chea; Price Heneveld LLP

(57) ABSTRACT

A vehicle seatback assembly includes an outer shell coupled to a seatback carrier via a releasable coupling arrangement. The releasable coupling arrangement can take various forms in order to securely couple the outer shell to the seatback carrier. A seatback frame is disposed between the seatback carrier and the outer shell in assembly. An airbag module is coupled to the seatback frame, and the releasable coupling arrangement is configured to release upon deployment of an airbag from the airbag module to define a peripheral gap between the outer shell and seatback carrier through which the airbag can be deployed.

5 Claims, 13 Drawing Sheets

(51) Int. Cl.
*B60R 21/215* (2011.01)
*B60R 21/231* (2011.01)

(56) References Cited

U.S. PATENT DOCUMENTS

| | | | |
|---|---|---|---|
| 3,663,057 A | 5/1972 | Lohr et al. | |
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |
| 4,629,248 A | 12/1986 | Mawbey | |
| 4,720,141 A | 1/1988 | Sakamoto et al. | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,799,971 A | 9/1998 | Asada | |
| 5,803,490 A | 9/1998 | Seventko et al. | |
| 5,826,938 A | 10/1998 | Yanase et al. | |
| 5,836,648 A | 11/1998 | Karschin et al. | |
| 5,895,070 A * | 4/1999 | Lachat | B60R 21/207 280/729 |
| 5,902,014 A | 5/1999 | Dinkel et al. | |
| 5,913,568 A | 6/1999 | Brightbill et al. | |
| 5,944,341 A | 8/1999 | Kimura et al. | |
| 5,951,039 A | 9/1999 | Severinski et al. | |
| 6,019,387 A * | 2/2000 | Jost | B60R 21/207 280/730.2 |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,231,068 B1 | 5/2001 | White et al. | |
| 6,234,518 B1 | 5/2001 | Ryl et al. | |
| 6,296,308 B1 | 10/2001 | Cosentino et al. | |
| 6,302,431 B1 | 10/2001 | Sasaki et al. | |
| 6,312,050 B1 | 11/2001 | Eklind | |
| 6,352,304 B1 | 3/2002 | Sorgenfrei | |
| 6,357,789 B1 | 3/2002 | Harada et al. | |
| 6,364,414 B1 | 4/2002 | Specht | |
| 6,375,269 B1 | 4/2002 | Maeda et al. | |
| 6,386,577 B1 | 5/2002 | Kan et al. | |
| 6,394,546 B1 | 5/2002 | Knoblock et al. | |
| 6,439,597 B1 | 8/2002 | Harada et al. | |
| 6,454,353 B1 | 9/2002 | Knaus | |
| 6,457,741 B2 | 10/2002 | Seki et al. | |
| 6,523,892 B1 | 2/2003 | Kage et al. | |
| 6,550,856 B1 | 4/2003 | Ganser et al. | |
| 6,554,365 B2 | 4/2003 | Karschin et al. | |
| 6,561,540 B1 | 5/2003 | Hasegawa et al. | |
| 6,565,150 B2 | 5/2003 | Fischer et al. | |
| 6,578,911 B2 | 6/2003 | Harada et al. | |
| 6,588,838 B1 | 7/2003 | Dick et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,991,256 B2 | 1/2006 | Henderson et al. | |
| 6,997,473 B2 | 2/2006 | Tanase et al. | |
| 7,025,423 B2 | 4/2006 | Fujita et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,134,686 B2 | 11/2006 | Tracht et al. | |
| 7,159,934 B2 | 1/2007 | Farquhar et al. | |
| 7,185,950 B2 | 3/2007 | Pettersson et al. | |
| 7,195,274 B2 | 3/2007 | Tracht | |
| 7,195,277 B2 | 3/2007 | Tracht et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,284,768 B2 | 10/2007 | Tracht | |
| 7,344,189 B2 | 3/2008 | Reed et al. | |
| 7,350,803 B2 | 4/2008 | Abramczyk et al. | |
| 7,350,859 B2 | 4/2008 | Klukowski | |
| 7,357,412 B2 | 4/2008 | Tracht et al. | |
| 7,393,005 B2 * | 7/2008 | Inazu | B60N 2/5825 280/728.2 |
| 7,401,852 B2 | 7/2008 | Humer et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,540,529 B2 | 6/2009 | Tracht et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 * | 1/2010 | Grimm | B60N 2/449 297/216.13 |
| 7,669,888 B2 | 3/2010 | Sato et al. | |
| 7,669,925 B2 * | 3/2010 | Beck | B60N 2/5825 297/218.3 |
| 7,669,928 B2 | 3/2010 | Snyder | |
| 7,677,594 B2 | 3/2010 | Hazlewood et al. | |
| 7,699,339 B2 | 4/2010 | Jang et al. | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,809 B2 * | 9/2010 | Ryan | B60R 21/207 280/730.1 |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,866,689 B2 | 1/2011 | Saberan | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,926,872 B2 * | 4/2011 | Chida | B60N 2/4228 297/216.13 |
| 7,931,294 B2 | 4/2011 | Okada et al. | |
| 7,931,330 B2 | 4/2011 | Itou et al. | |
| 7,938,440 B2 | 5/2011 | Kataoka et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |

(56) References Cited

U.S. PATENT DOCUMENTS

| | | | |
|---|---|---|---|
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,727,374 B1* | 5/2014 | Line | B60R 21/207 280/728.3 |
| 8,807,594 B2* | 8/2014 | Mizobata | B60N 2/6009 280/730.2 |
| 8,905,431 B1* | 12/2014 | Line | B60R 21/215 280/728.2 |
| 8,967,663 B2* | 3/2015 | Seki | B60N 2/4228 280/730.2 |
| 8,979,204 B2* | 3/2015 | Awata | B60N 2/5825 297/218.3 |
| 9,096,157 B2* | 8/2015 | Line | B60N 2/5642 |
| 9,126,504 B2* | 9/2015 | Line | B60N 2/4838 |
| 9,126,508 B2* | 9/2015 | Line | B60N 2/2222 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2006/0113765 A1 | 6/2006 | Tracht | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0102255 A1 | 4/2009 | D'Agostini et al. | |
| 2009/0165263 A1 | 7/2009 | Smith | |
| 2009/0322124 A1 | 12/2009 | Barkow et al. | |
| 2010/0007122 A1 | 1/2010 | Clauser et al. | |
| 2010/0038937 A1 | 2/2010 | Andersson et al. | |
| 2010/0133794 A1 | 6/2010 | Tracht et al. | |
| 2010/0140986 A1 | 6/2010 | Sawada | |
| 2010/0148546 A1 | 6/2010 | Demontis et al. | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1* | 5/2011 | Brncick | B60N 2/0232 297/284.2 |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2011/0309604 A1 | 12/2011 | Moore et al. | |
| 2012/0032486 A1 | 2/2012 | Baker et al. | |
| 2012/0037754 A1 | 2/2012 | Kladde | |
| 2012/0043791 A1 | 2/2012 | Kojima | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1* | 5/2012 | Brncick | B60N 2/643 297/284.2 |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1* | 3/2013 | Kulkarni | B60N 2/643 297/301.1 |
| 2013/0119724 A1* | 5/2013 | Adachi | B60N 2/42745 297/216.14 |
| 2014/0070594 A1* | 3/2014 | Awata | B60N 2/5825 297/452.48 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergo-nomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

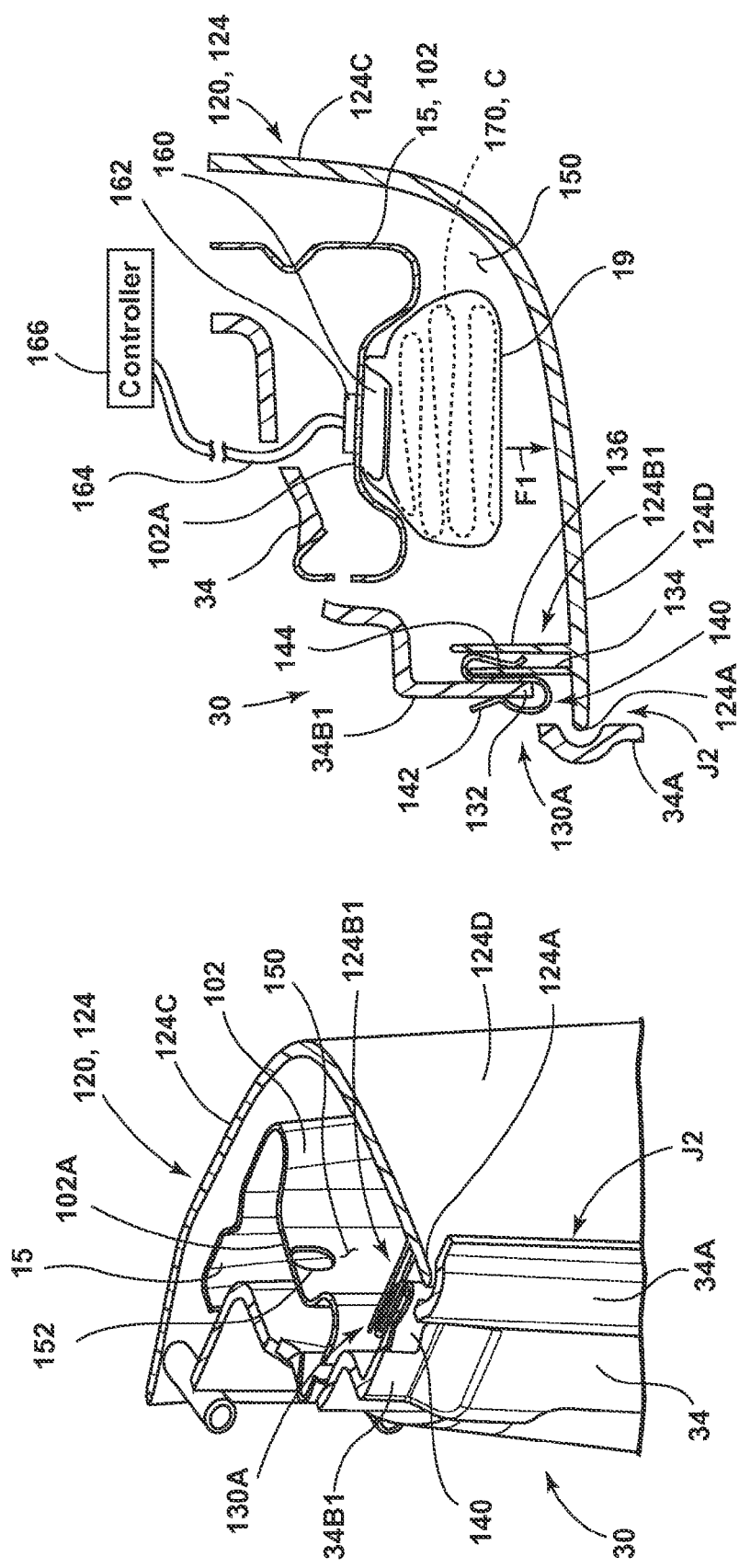

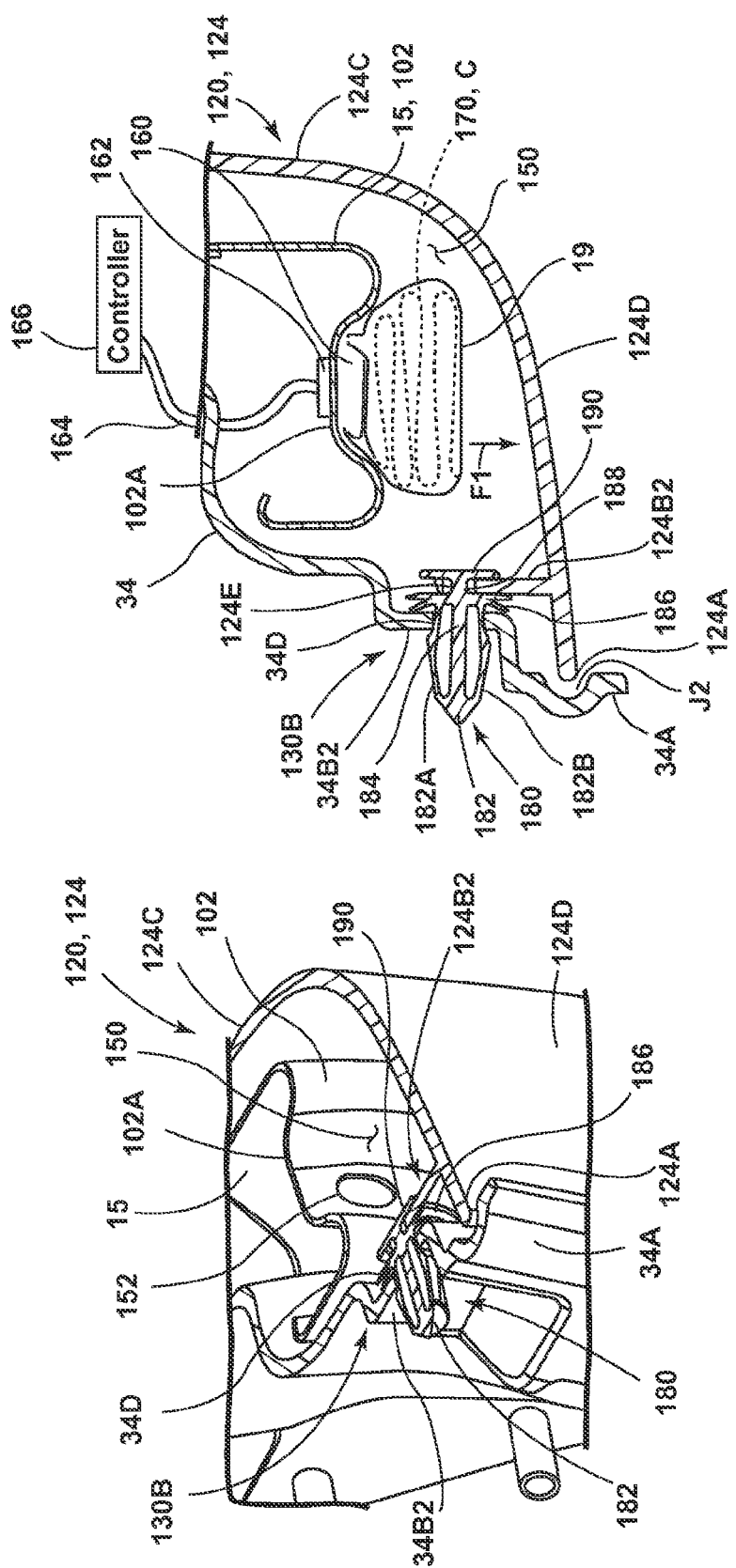

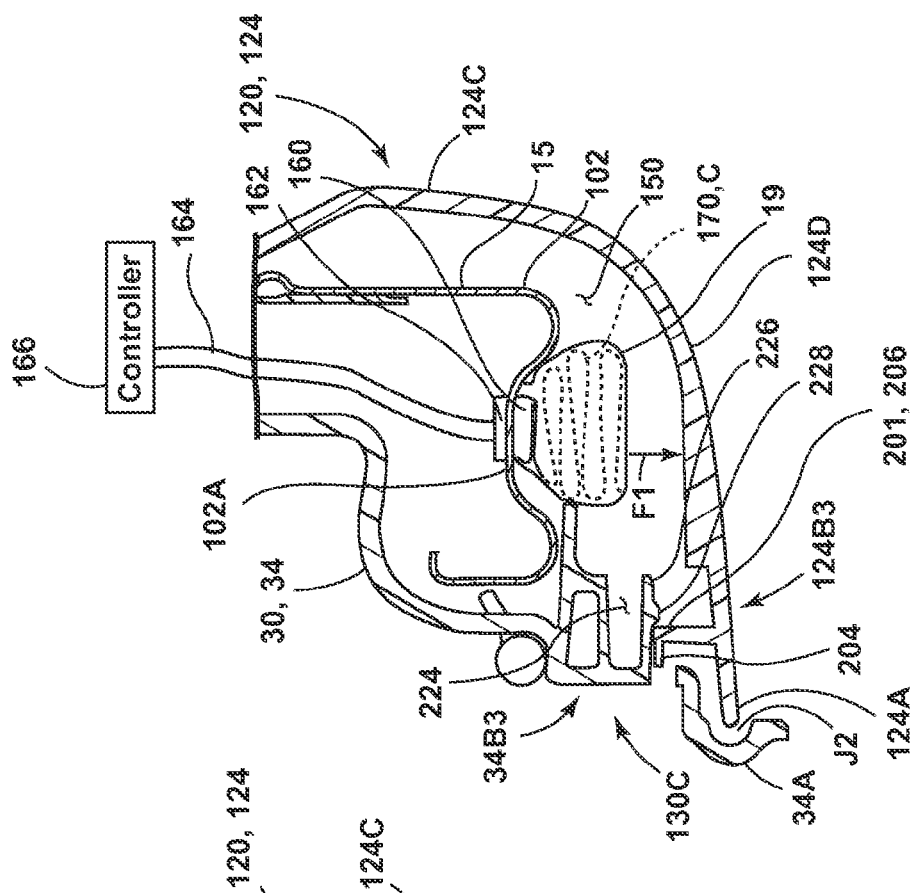
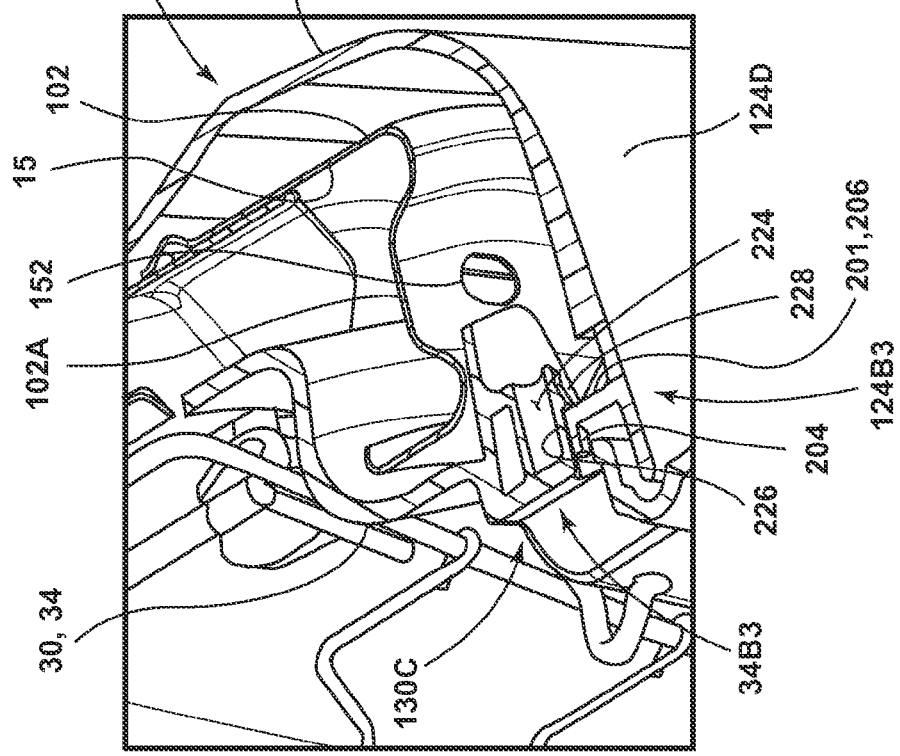

VEHICLE SEAT ASSEMBLY WITH SIDE-IMPACT AIRBAG DEPLOYMENT MECHANISM

FIELD OF THE INVENTION

The present invention generally relates to a vehicle seat assembly, and more particularly, to a vehicle seat assembly having modular components which are coupled together in such a way as to allow for effective deployment of a side-impact airbag device.

BACKGROUND OF THE INVENTION

Vehicle seat assemblies are currently provided having integrated safety features for the protection of the vehicle occupant. Vehicle seat assemblies must be constructed in such a way that the vehicle seat is structurally sound and provides the support necessary for a vehicle occupant. In order to improve the safety features of a vehicle seat, an airbag deployment device may be incorporated into the vehicle seat design. When an airbag deployment device is integrated into the vehicle seat design, the assembly of the vehicle seat must accommodate proper deployment of the airbag deployment device. Thus, it is desirable to provide a seat assembly that can be assembled in an efficient manner while providing coupling features that are configured to allow for proper deployment of an airbag deployment device.

SUMMARY OF THE INVENTION

One aspect of the present invention includes a vehicle seatback assembly having a rear seatback module defined by an outer shell, wherein the outer shell includes first and second side members. One or more mounting features are disposed on one of the first and second side members of the outer shell. A seatback carrier includes first and second side members, which are configured to align with the first and second side members of the outer shell in assembly. One or more mounting members are disposed on one of the first and second side members of the seatback carrier. In assembly, the one or more mounting features disposed on the outer shell are configured to align with the one or more mounting members disposed on the seatback carrier. A releasable coupling arrangement is defined between the one or more mounting features disposed on the outer shell and the one or more mounting members disposed on the seatback carrier. An airbag module is coupled to a seatback frame disposed between the seatback carrier and the outer shell. The releasable coupling arrangement is configured to release upon deployment of the airbag module to disengage a portion of the outer shell from the seatback carrier along a mating joint formed therebetween.

Another aspect of the present invention includes a vehicle seatback assembly having an outer shell releasably engaged with a seatback carrier via a coupling arrangement to define a mating joint therebetween. A seatback frame is disposed between the seatback carrier and the outer shell. An airbag module is coupled to the seatback frame and the coupling arrangement is configured to release upon deployment of the airbag module to disengage a portion of the outer shell from the seatback carrier along the mating joint.

Yet another aspect of the present invention includes a vehicle seatback assembly having an outer shell coupled to a seatback carrier via a releasable coupling arrangement. A seatback frame is disposed between the seatback carrier and the outer shell in assembly. An airbag module is coupled to the seatback frame, and the releasable coupling arrangement is configured to release upon deployment of an airbag from the airbag module to define a peripheral gap between the outer shell and seatback carrier through which the airbag can be deployed.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6A is a fragmentary cross-sectional view taken at line VIA of FIG. 5, showing a coupling arrangement between the seatback carrier and rear seatback module according to one embodiment;

FIG. 6B is a cross-sectional top plan view of the coupling arrangement shown in FIG. 6A including an airbag module;

FIG. 7A is a fragmentary cross-sectional view taken at line VIA of FIG. 5, showing a coupling arrangement between the seatback carrier and rear seatback module according to another embodiment;

FIG. 7B is a cross-sectional top plan view of the coupling arrangement shown in FIG. 7B;

FIG. 10A is a fragmentary cross-sectional view taken at line VIA of FIG. 5, showing a coupling arrangement between the seatback carrier and rear seatback module according to another embodiment;

FIG. 10B is a cross-sectional top plan view of the coupling arrangement shown in FIG. 10A.

DETAILED DESCRIPTION OF THE PREFERRED EMBODIMENTS

Figure 1:
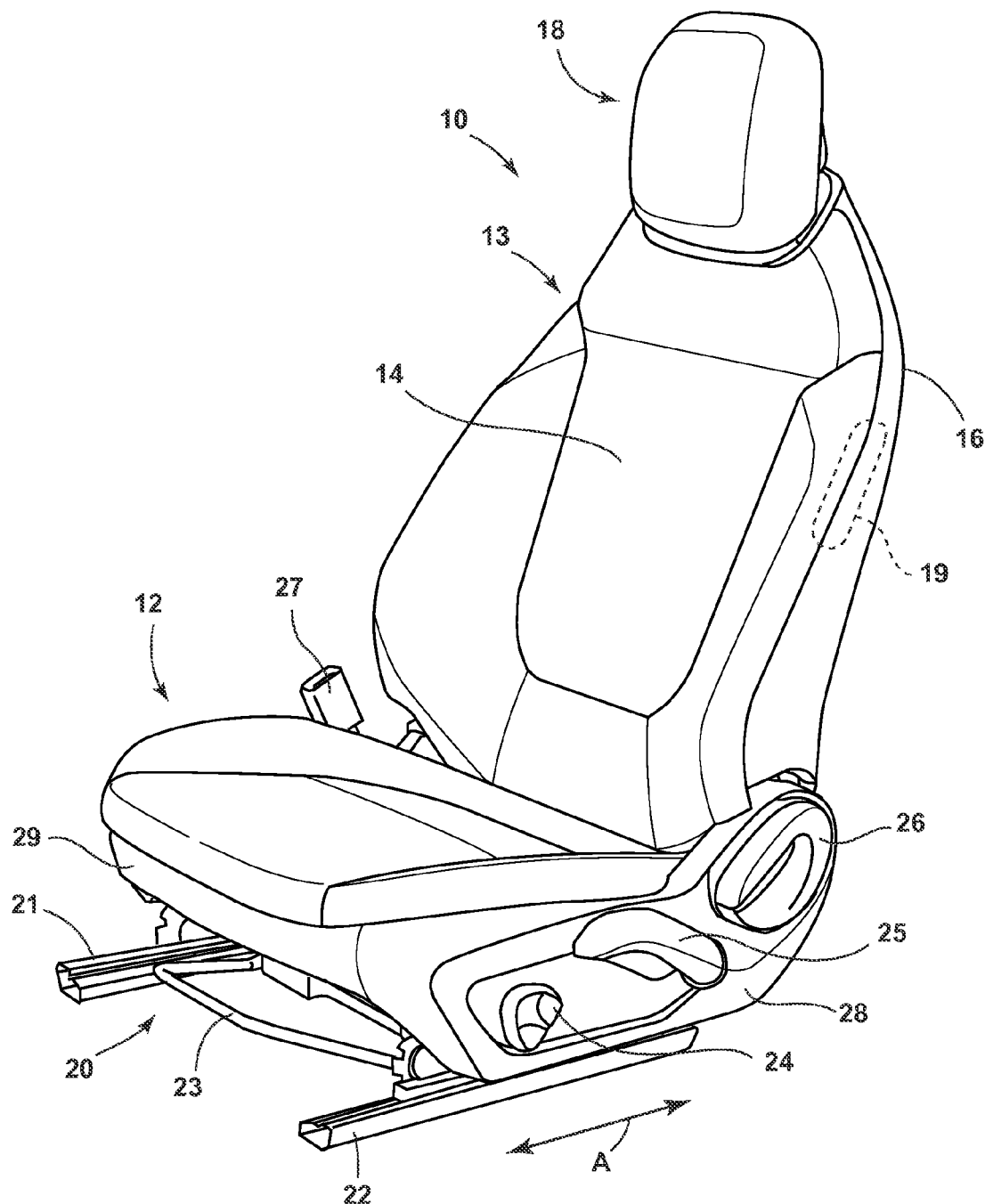
FIG. 1 is a perspective view of a vehicle seat assembly according to one embodiment of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a vehicle seat assembly according to an embodiment of the present disclosure. The vehicle seat assembly 10 includes a seat module 12 and a seatback assembly 13 which is contemplated to be pivotally coupled to the seat module 12. The seatback assembly 13 includes a front seatback module 14 and a rear seatback module 16 which are coupled to one another and supported by a seatback frame 15 (FIG. 4), as further described below. A headrest module 18 is coupled to the seatback assembly 13 at an upper portion thereof. The seat module 12, as shown in FIG. 1, is operably coupled to a track assembly 20 having first and second rails 21, 22 and a lever 23 configured for moving the vehicle seat assembly 10 between fore and aft positions as indicated by arrow A. As further shown in FIG. 1, a user control module 24 is mounted to a trim component 28 and is contemplated to be used to adjust the vehicle seat assembly 10 with regards to position and comfort settings. A lever 25 is further coupled to trim component 28 and can be used to actuate pivotal movement of the seatback assembly 13 relative to the seat module 12. A cap 26 is further mounted to trim component 28 and covers the pivotal mounting location of the seatback assembly 13 to the seat module 12. As further shown in FIG. 1, a seatbelt buckle receptacle 27 is also mounted to the seat module 12 and a front trim component 29 is disposed on a forward most portion of the seat module 12, such that the trim component 28 and trim component 29 cover a seat frame used to support the seat module 12.

Figure 2:
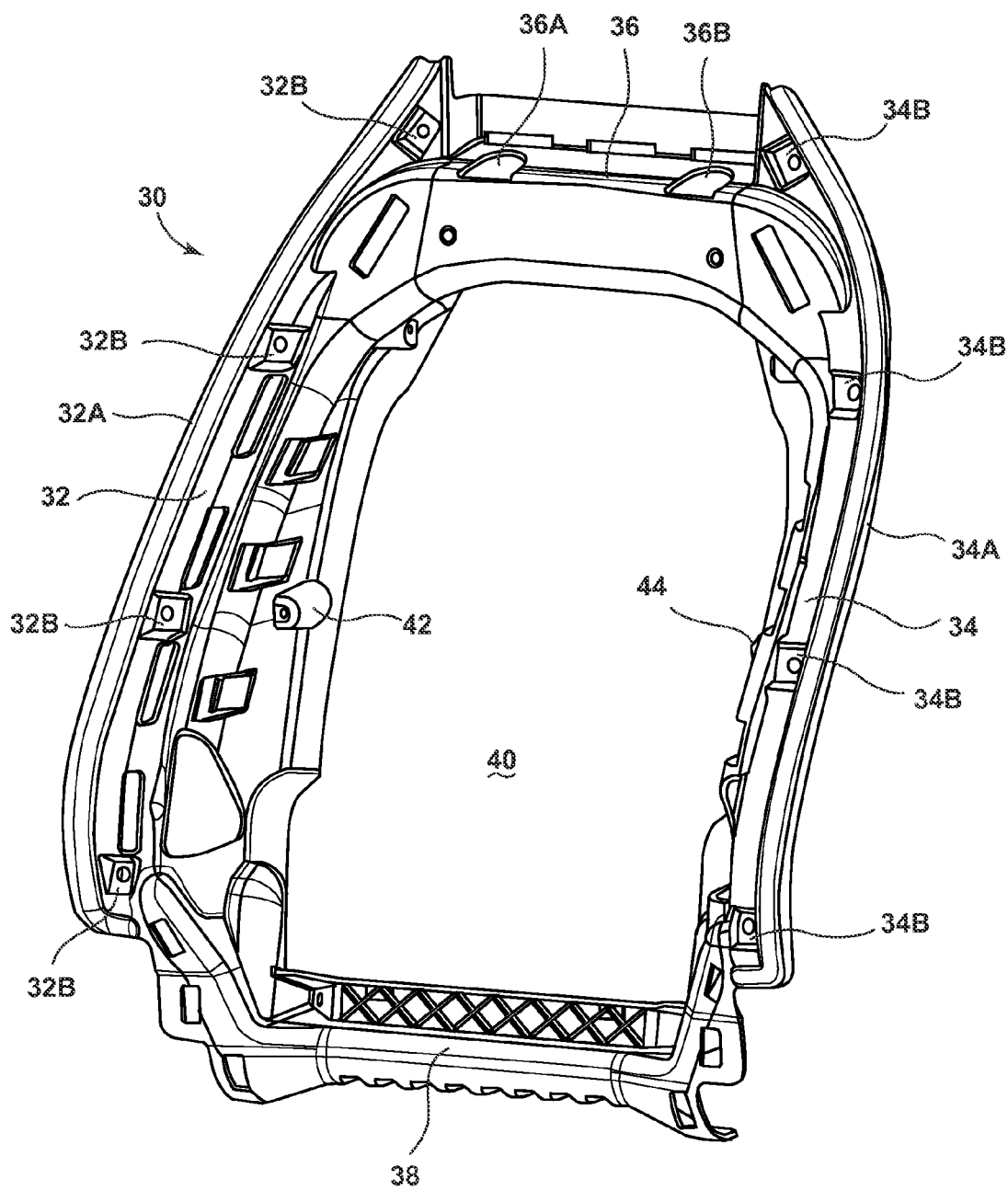
FIG. 2 is a perspective view of a seatback carrier of a vehicle seat.

As further shown in FIG. 1, the vehicle seat assembly 10 includes an airbag module 19 which, as further described below, is coupled to the seatback frame 15 (FIG. 4) in assembly. The airbag module 19, as shown in FIG. 1, is a deployable side-impact airbag (SAB) module configured to deploy an airbag when a collision event is sensed by a vehicle controller. The sensing capabilities of the vehicle controller are carried out in a manner generally known by one of ordinary skill in the art. The vehicle seat assembly 10 shown in FIG. 1 is contemplated to be a driver's side seat assembly, but may also be used on a passenger's side, in a mid-row location, in a rear seat location, or in third row option within a vehicle, wherein the location of the airbag module 19 may change accordingly. As generally understood in the art, a side-impact airbag module is generally positioned on a vehicle seat adjacent to a body component of the vehicle, such as a door or window, for outward deployment Referring now to FIG. 2, a seatback carrier 30 is shown having first and second side members 32, 34 which are generally spaced apart and interconnected by upper and lower cross-members 36, 38. As shown in FIG. 2, the side members 32, 34 and upper and lower cross-members 36, 38 generally frame a central aperture 40 in assembly. The seatback carrier 30 is contemplated to be a composite part which is comprised of a polymeric or injection molded material, such that the seatback carrier 30 is a unitary part as shown in FIG. 2. The seatback carrier 30 is a component part of the front seatback assembly 14 shown in FIG. 1, and further described below. The first and second side members 32, 34 generally include outermost edges 32A, 34A, respectively. The outermost edges 32A, 34A generally define side perimeters of the seatback carrier 30, and also form a portion of a mating joint feature as further described below. The first and second side members 32, 34 further include a plurality of mounting members 32B, 34B, respectively, which are generally disposed adjacent to the outer edges 32A, 34A along a periphery of the seatback carrier 30, as shown in FIG. 2. The mounting members 32B, 34B of the first and second side members 32, 34 are configured to couple the seatback carrier 30 to the rear seatback module 16 (FIG. 1), as further described below. It is contemplated that the mounting members 32B, 34B may include a variety of configurations for accommodating various coupling arrangements between the seatback carrier 30 and the rear seatback module 16. As further shown in FIG. 2, inner mounting structures 42, 44 are disposed on inner portions of the first and second side members 32, 34 and may be used to couple the seatback carrier 30 to the seatback frame 15 (FIG. 4), or other like structure. With reference to the upper cross member 36, receiving apertures 36A, 36B are disposed thereon, and configured to receive support structures for the headrest assembly 18, as further described below.

Figure 3A:
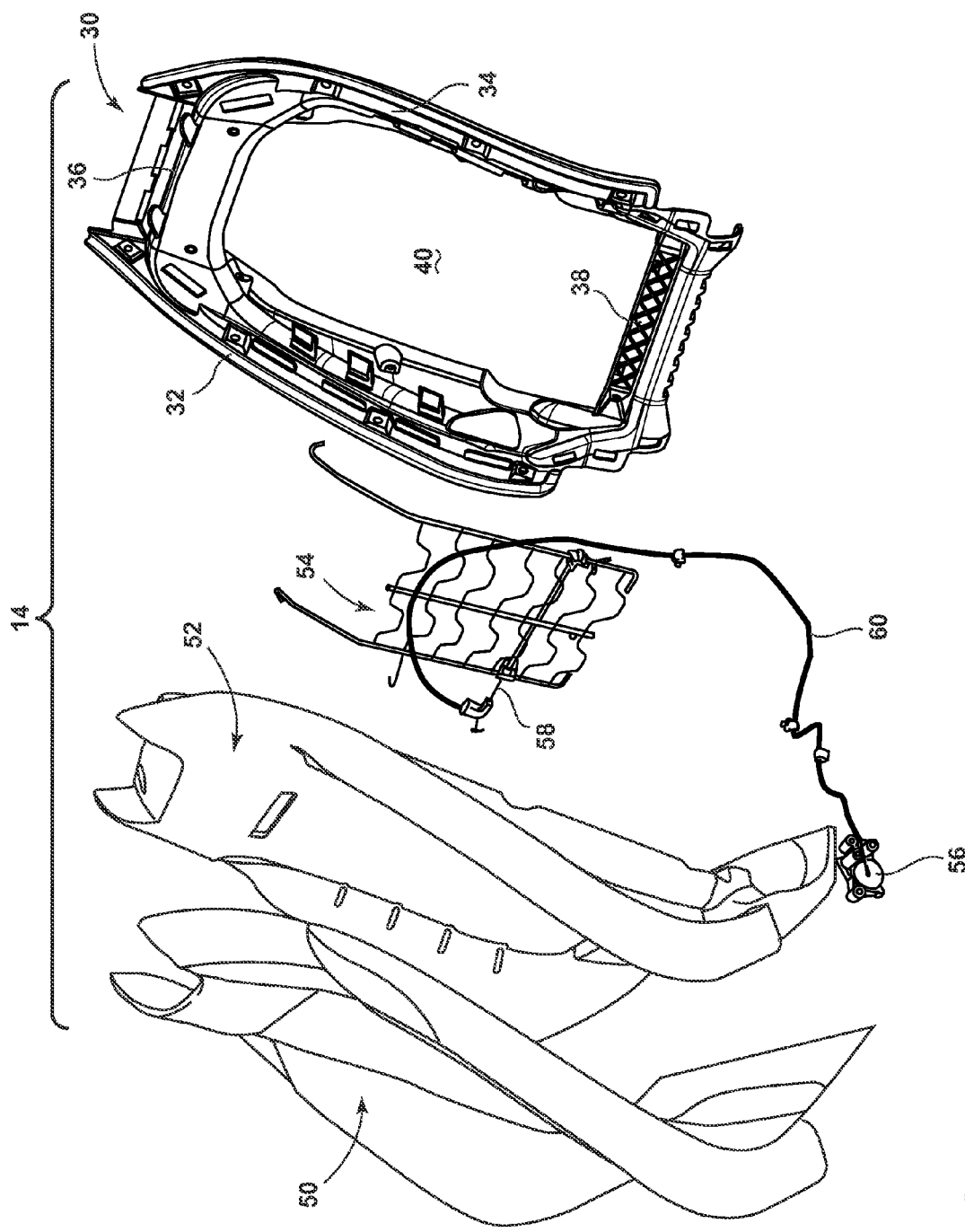
FIG. 3A is an exploded perspective view of a front seatback module including the seatback carrier of FIG. 2.

Referring now to FIG. 3A, the front seatback module 14 is shown in an exploded view and includes an upholstered cover 50 and a support cushion 52 which are both contoured components having reciprocal configurations, such that the upholstered cover 50 covers the support cushion 52 in assembly. The upholstered cover 50 is contemplated to be comprised of a fabric, vinyl or leather material, or other like covering material (or combination thereof), while the support cushion 52 is contemplated to be comprised of a resilient foam material which may include areas of varying density or rigidity. In assembly, the upholstered cover 50 and support cushion 52 are further coupled to and supported by the seatback carrier 30. A lumbar support mechanism 54 is also shown in FIG. 3A which is contemplated to be coupled to and controlled by user control module 24 (FIG. 1) via a motor 56 and a cable 58 which is housed in a cable housing 60. In assembly, the lumbar support mechanism 54 is generally mounted in aperture 40 of the seatback carrier 30.

Figure 3B:
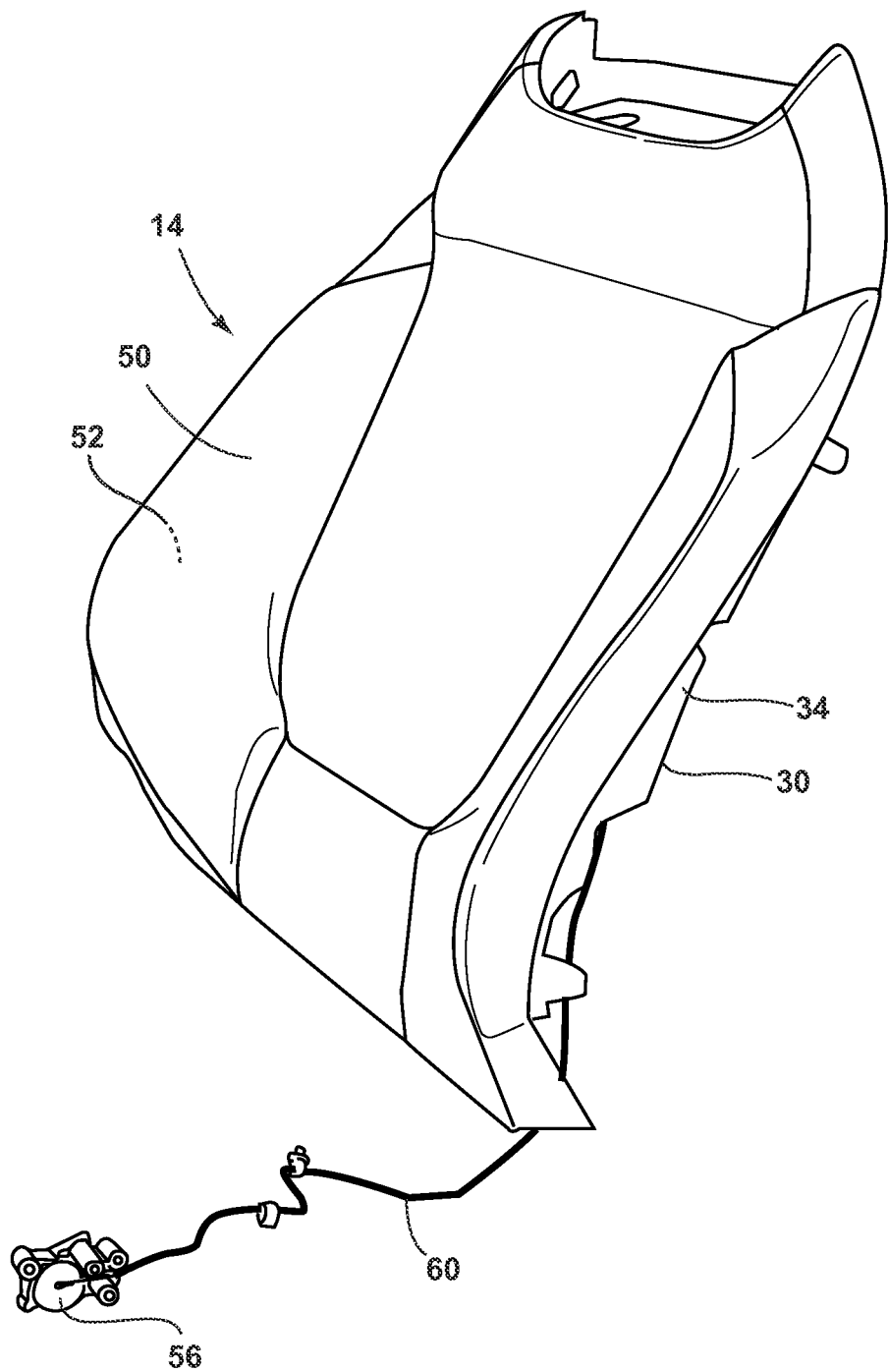
FIG. 3B is a perspective view of the front seatback module of FIG. 3A as assembled.

Referring now to FIG. 3B, the front seatback module 14 is shown in an assembled condition, wherein the components described above with reference to FIG. 3A are coupled together to form the front seatback module 14. Specifically, the upholstered cover 50 is shown covering the support cushion 52, which is then coupled to and supported by the seatback carrier 30.

Figure 4:
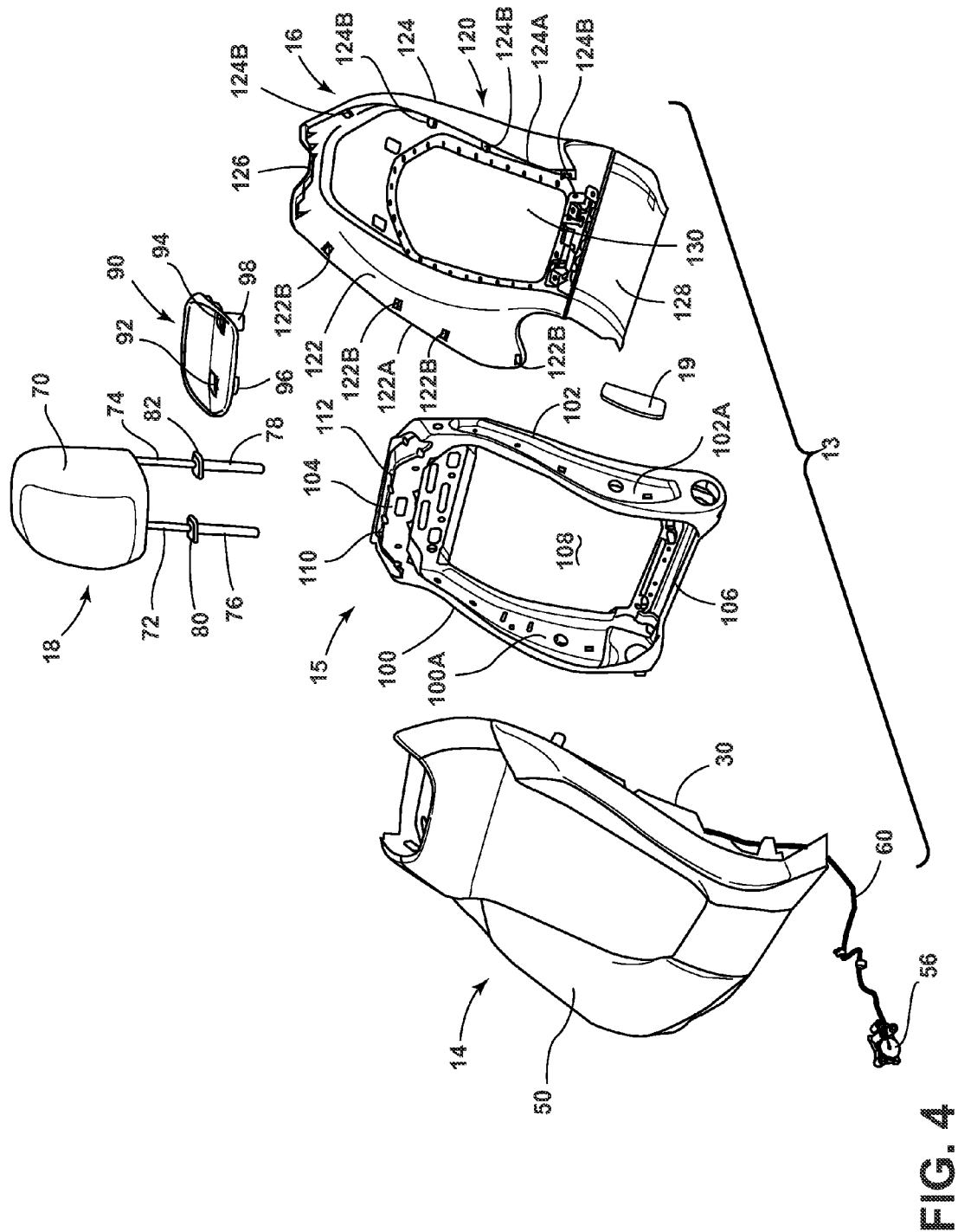
FIG. 4 is a perspective exploded view of the front seatback module of FIG. 3B, a rear seatback module, and a headrest module exploded away from a seatback frame.

Referring now to FIG. 4, the headrest module 18 is shown exploded away from the component parts of the seatback assembly 13. The headrest module 18 includes a head restraint 70 having first and second support posts 72, 74 extending downwardly therefrom. The first and second support posts 72, 74 include sleeves 76, 78 in which the first and second support posts 72, 74 are slideably received. The sleeves 76, 78 further include head portions 80, 82, respectively, which are configured to fit into mounting apertures 92, 94 disposed on a guide member 90. The guide member 90 includes first and second guide channels 96, 98 through which sleeves 76, 78 are received. The first and second guide channels 96, 98 disposed in the guide member 90 define anchor holes to which the first and second support posts 72, 74 are operably coupled in assembly. In assembly, the head restraint 70 is mounted to the guide member 90 by having the first and second support posts 72, 74 received in sleeves 76, 78 which are further received in the first and second guide channels 96, 98 of the guide member 90. With the head restraint 70 mounted in the guide member 90, the headrest module 18 provides a robust head restraint execution that is easy to assembly while providing both comfort and safety features.

As further shown in FIG. 4, the seatback frame 15 generally includes first and second side members 100, 102 which are spaced-apart and interconnected by an upper cross member 104 and a lower cross member 106. The first and second side members 100, 102 and upper and lower cross members 104, 106 generally frame a central aperture 108. In this way, the seatback frame 15 has a configuration similar to the seatback carrier 30. The first and second side members 100, 102 include laterally extending recessed portions 100A, 102A which are indentations configured to house the airbag module 19 in assembly. For purposes of this disclosure, the airbag module 19 is shown throughout as being disposed on the second side member 102 of the seatback frame 15. However, it is contemplated that the airbag module 19 can be disposed on the first side member 100 of the seatback frame 15, such that the vehicle seat assembly 10 (FIG. 1) can be configured for use as a driver's side or passenger's side assembly. The upper cross member 104 of the seatback frame includes mounting apertures 110, 112 which align with the receiving apertures 36A, 36B of the seatback carrier 30 to receive the first and second guide channels 96, 98 of the guide member 90 or the first and second support posts 72, 74 of the head restraint 70 in assembly. The seatback frame 15 is contemplated to be a reinforced metal seatback frame for providing sufficient support for a vehicle occupant in use. The seatback frame 15 further provides structural support for the attachment of the front seatback module 14 and rear seatback module 16 in assembly.

Referring again to FIG. 4, the rear seatback module 16 is shown as an outer shell 120, which generally includes first and second side members 122, 124 which are spaced-apart and interconnected by upper and lower cross members 126, 128. A lumbar support member 130 is disposed between the first and second side members 122, 124 and upper and lower cross members 126, 128. With the first and second side members 122, 124 and upper and lower cross members, the outer shell 120 has a similar configuration to the seatback carrier 30 and seatback frame 15 for coupling thereto. The outer shell 120 of the rear seatback module 16 further includes outermost edges 124A, 124B and a plurality of mounting features 122B, 124B which are used to couple the rear seatback module 16 to the front seatback module 14 around the seatback frame 15 in assembly. Specifically, the mounting features 122B, 124B are used in conjunction with a coupling arrangement, described below, to mount the rear seatback module 16 to the seatback carrier 30 of the front seatback module 14. The mounting features 122B, 124B are generally disposed on the first and second side members 122, 124 of the outer shell 120 along a perimeter thereof. In this way, mounting features 122B, 124B align with the mounting members 32B, 34B of the seatback carrier 30 for coupling thereto. The outer shell 120 is contemplated to be an injection molded polymeric part, providing the structural rigidity necessary for the seatback assembly 13 as assembled in FIG. 1.

Figure 5:
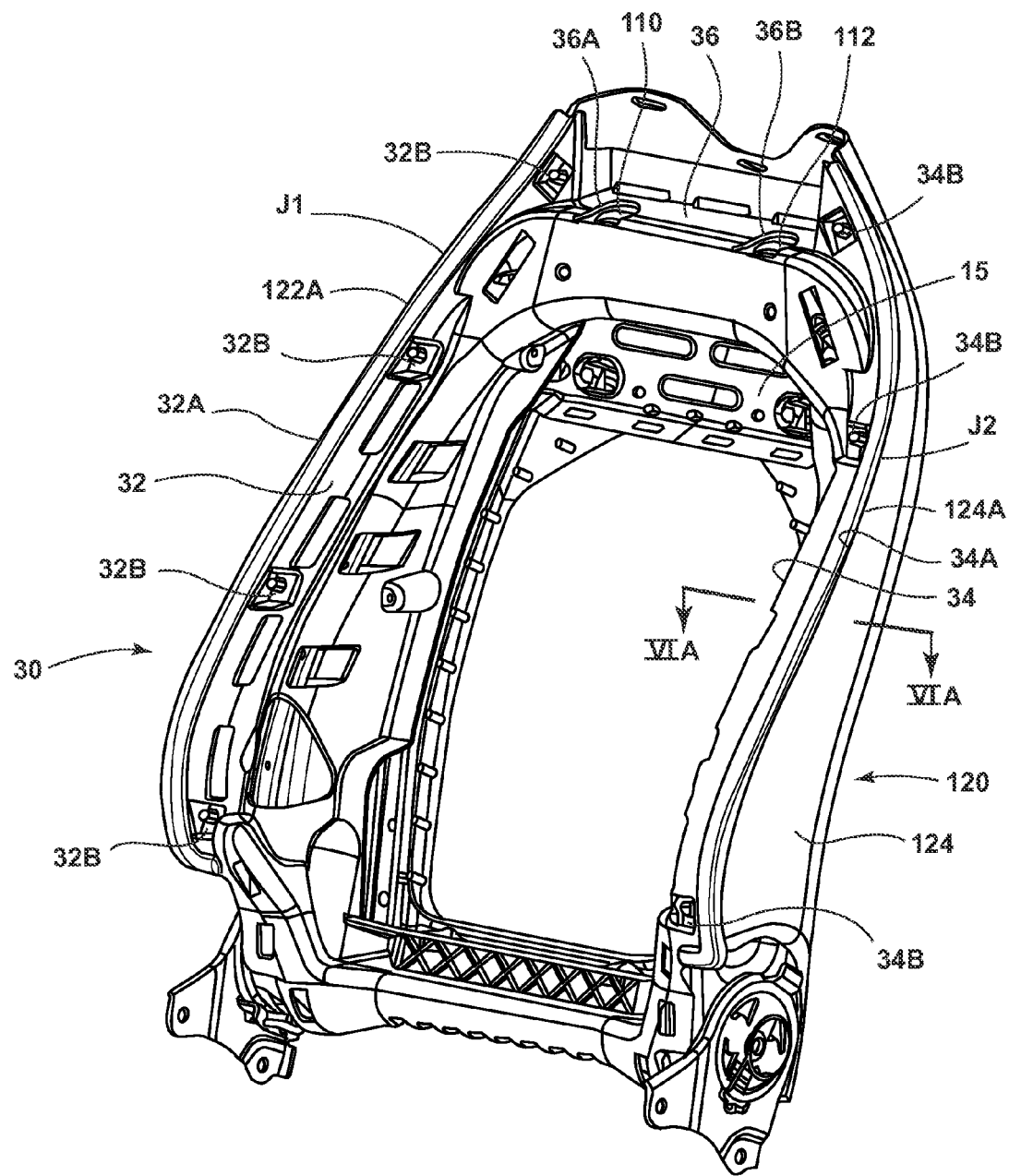
FIG. 5 is a perspective view of the seatback carrier of FIG. 2 coupled to the seatback frame and rear seatback module of FIG. 4.

Referring now to FIG. 5, the outer shell 120 and seatback carrier 30 are coupled together around the seatback frame 15. As noted above, the mounting members 32B and 34B of the seatback carrier 30 are configured to align with the mounting features 122B, 124B of the outer shell 120. In the configuration shown in FIG. 5, it is contemplated that the mounting members 32B, 34B of the seatback carrier 30 and the mounting features 122B, 124B of the outer shell 120 are in fact aligned, such that the seatback carrier 30 and outer shell 120 are coupled to one another using a coupling arrangement at the location of the mounting members 32B, 34B and mounting features 122B, 124B. As further shown in FIG. 5, the receiving apertures 36A, 36B of the upper cross member 36 of seatback carrier 30 are aligned with the mounting apertures 110, 112 of the seatback frame 15 for receiving and supporting the headrest module 18 (FIG. 4). The outer edge 32A of first side member 32, as well as the outer edge 34A of second side member 34 align with the outer edges 122A, 124A, respectively, of the outer shell 120 to define first and second seams or mating joints J1, J2. In this way, the outer edges 32A, 34A of the seatback carrier 30 and the outer edges 122A, 124A of the outer shell 120 form component parts of mating joint features at first and second mating joints J1, J2. The first and second joints J1, J2 define seams which are configured to expand to form a peripheral gap therealong due to a release of the various coupling arrangements used in conjunction with the mounting members 32B, 34B and mounting features 122B, 124B between the seatback carrier 30 and the outer shell 120. The various embodiments for the coupling arrangements between the seatback carrier 30 and outer shell 120 will now be described.

Referring now to FIGS. 6A and 6B, a cross-sectional view of the seatback carrier 30 and outer shell 120 is shown, wherein the seatback carrier 30 is coupled to the outer shell 120 via a coupling arrangement 130A around the seatback frame 15. In the embodiment shown in FIGS. 6A and 6B, the coupling arrangement 130A is located at a mounting member 34B1 of second side member 34 of the seatback carrier 30 and mounting feature 124B1 disposed on second side member 124 of the outer shell 120. It will be understood by one of ordinary skill that the mounting member 34B1 shown in FIGS. 6A and 6B is an exemplary embodiment of the plurality of mounting members 32B, 34B disposed along the periphery of the seatback carrier 30 (FIG. 2), and that mounting feature 124B1 is an exemplary embodiment of the mounting features 122B, 124B disposed along the periphery of the outer shell 120 as shown in FIG. 4. The embodiment of the coupling arrangement 130A may be utilized at all the locations where mounting members 32B, 34B align with mounting features 122B, 124B as described above with reference to FIG. 5. Further, it is contemplated that the coupling arrangement 130A may also be utilized only at the mounting members 32B, 34B and mounting features 122B, 124B that are disposed adjacent to an airbag module 19, as shown in FIG. 6B. As further described below, the coupling arrangement 130A is a releasable coupling arrangement that allows for the deployment of the airbag module 19 through mating joint J2. As such, the releasable coupling arrangement 130A need only be present adjacent an airbag module, such as airbag module 19. For ease of assembly, it is contemplated that the coupling arrangement 130A may be located throughout the seatback assembly 13 (FIG. 1), but is not necessarily so.

As shown in FIGS. 6A, 6B, the mounting member 34B1 is a substantially planar tab having a distal end 132. As best shown in FIG. 6B, mounting feature 124B1 of the second side member 124 of outer shell 120 is defined first and second mounting fins 134, 136 which are spaced-part from one another and which further extend inwardly from second side member 124 into a cavity 150. A clip member 140 is shown having a first arm 142 coupled to mounting member 34B1 at distal end 132 and a second arm 144 coupled to the first mounting fin 134, such that the second arm 144 is disposed between the first and second mounting fins 134, 136 in assembly. In this way, the coupling arrangement 130A couples the seatback carrier 30 to the outer shell 120 at mounting member 34B1 of the seatback carrier 30 and mounting feature 124B1 of the outer shell 120 using the clip member 140.

As further shown in FIGS. 6A and 6B, the second side 124 of outer shell 120 includes a first portion 124C and a second portion 124D. In assembly, the first portion 124C faces a car-rearward direction, while the second portion 124D faces a peripheral side of the vehicle as positioned therein. The second side 124 of outer shell 120 is spaced-apart from the second side 102 of the seatback frame 15 to define cavity 150 therebetween. As best shown in FIG. 6B, the airbag module 19 is mounted to the second side 102 of the seatback frame 15 within cavity 150 and is substantially concealed by second side 124 of the outer shell 120.

Figure 6C:
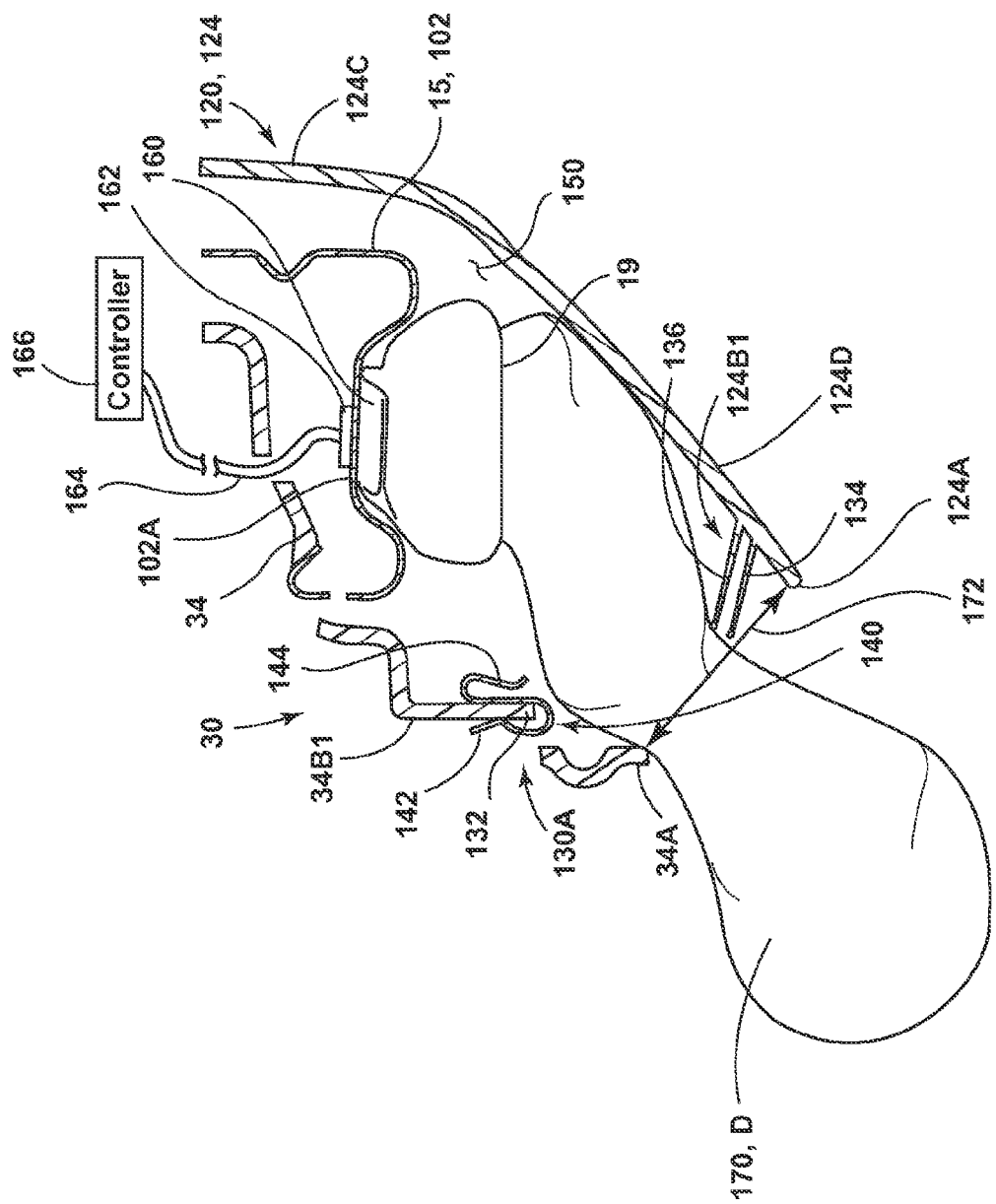
FIG. 6C is a cross-sectional top plan view of the coupling arrangement shown in FIG. 6B, showing an airbag in a deployed condition.

With specific reference to FIG. 6A, a mounting aperture 152 is shown disposed on the second side 102 of seatback frame 15 at recessed portion 102A. More specifically, the recessed portion 102A of second side member 102 of seatback frame 15 is shaped to retain the airbag module 19 (FIG. 6B) at mounting aperture 152 (FIG. 6A). As shown in FIG. 6B, a support member 160 of the airbag module 19 is mounted to the recessed portion 102A of second side member 102 of seatback frame 15 within cavity 150 at mounting aperture 152, via fastener 162. The support member 160, as shown in FIG. 6B, houses an electrical lead 164 that extends from the airbag module 19 through mounting aperture 152 to electrically couple the airbag module 19 with a vehicle controller 166, which may be disposed in a remote location within a vehicle interior, such as a vehicle instrument panel. It is contemplated that the vehicle controller 166 actuates the deployment of an airbag 170 (FIGS. 6B and 6C) from the airbag module 19 to inflate the airbag 170 from a contained position C (FIG. 6B) to a deployed position D (FIG. 6C) when the vehicle controller 166 senses a collision event.

Referring again to FIG. 6B, the airbag module 19 is shown having the airbag 170 in the contained position C. When a collision event is sensed by the vehicle controller 166, the airbag module 19 is configured to deploy the airbag 170 from the contained position C (FIG. 6B) to the deployed position D (FIG. 6C). To allow the airbag 170 to deploy, it is contemplated that the second side member 124 of outer shell 120 is flexibly resilient along first and second portions 124C, 124D. It is further contemplated that the second side member 34 of the seatback carrier 30 is also flexibly resilient, to allow for the release of the coupling arrangement 130A. With one or both of the second side members 34, 124 being flexibly resilient, a deployment force imparted by the airbag 170 of airbag module 19 can flex either one of the second side members 34, 124 to form a peripheral gap 172 at mating joint J2 through which the airbag 170 can deploy.

As further illustrated in FIG. 6C, the airbag 170 is deployed from airbag module 19 in a car-forward and outward direction through the seam or mating joint J2 by acting on the coupling arrangement 130A of the clip member 140 and mounting member 34B1 and first and second mounting fins 134, 136, thereby moving one or both of the outer edge 34A of the second side member 34 of the seatback carrier 30 away from the outer edge 124A of second side member 124 of the outer shell 120. This movement causes the coupling arrangement 130A of the clip member 140 and mounting member 34B1 and first and second mounting fins 134, 136 to release, thereby forming the peripheral gap 172 at mating joint J2. More specifically, as the airbag 170 deploys from the contained position C (FIG. 6B) to the deployed position D (FIG. 6C), the pressure realized from the deployment of the airbag 170 imparts a force (FIG. 6B) that causes the coupling arrangement 130A of the clip member 140 and mounting member 34B1 and first and second mounting fins 134, 136 to fail or release at a specific location disposed along cavity 150, thereby making the coupling arrangement 130A a releasable coupling arrangement. As noted above, cavity 150 is defined between the second side member 124 of the outer shell 120 and second side member 102 of the seatback frame 15.

As shown in FIG. 6C, in the deployed position D, the airbag 170 inflates and extends from the support member 160 outward and forward through the mating joint J2 at peripheral gap 172 formed between outer edges 34A, 124A and beyond the second side 124 of the outer shell 120. In this deployed position D, the airbag 170 provides a cushioned support between a seated passenger and an outboard interior surface of the vehicle, such as the side door or window. Upon inflation of the airbag 170, the airbag 170 deforms the second portion 124D of the second side 124 of the outer shell 120 laterally outward. Also, the deploying force of the airbag 170 may deform the second side 34 of the seatback carrier 30 forward, such that the mating joint J2 widens to define peripheral gap 172 at a consistent rate and orientation to accurately direct the airbag 170 forward beyond the second side 124 of the outer shell 120 with minimal resistance from the second side 124 of the outer shell 120. When the mating joint J2 widens to define peripheral gap 172, the coupling arrangement 130A is released. The deployed position D of the airbag 170, as shown in FIG. 6C, is merely one depiction of an incremental stage of deployment as the airbag 170 inflates at a rapid rate pushing the airbag 170 out from the support member 160 of the airbag module 19 in the outward and forward direction beyond the illustrated position. It is contemplated that the airbag 170 may inflate using gases generated from a pyrotechnic reaction, a compressed air release, and/or another chemical reaction or other conceivable inflation methods. It is also conceivable that after deployment of the airbag module 19, the airbag module 19 may be replaced and the seatback assembly 13 may be restored with minimal necessary repair.

Referring now to FIGS. 7A and 7B, a cross-sectional view of the seatback carrier 30 and outer shell 120 is shown, wherein the seatback carrier 30 is coupled to the outer shell 120 via another embodiment of a releasable coupling arrangement 130B around the seatback frame 15. In the embodiment shown in FIGS. 7A and 7B, the coupling arrangement 130B is located at mounting member 34B2 of second side member 34 of the seatback carrier 30 and mounting feature 124B2 disposed on second side member 124 of the outer shell 120. It will be understood by one of ordinary skill that the mounting member 34B2 shown in FIGS. 7A and 7B is exemplary of the plurality of mounting members 32B, 34B disposed around the periphery of seatback carrier 30 (FIG. 2), and that mounting feature 124B2 is exemplary of the plurality of mounting features 122B, 124B disposed around the periphery of the outer shell 120 as shown in FIG. 4. Like the releasable coupling arrangement 130A shown in FIGS. 6A-6C, the releasable coupling arrangement 130B may be utilized at all the locations where mounting members 32B, 34B align with mounting features 122B, 124B as described above with reference to FIG. 5, or only at locations of the seatback assembly 13 (FIG. 1) adjacent an airbag module, such as airbag module 19.

Figure 7C:
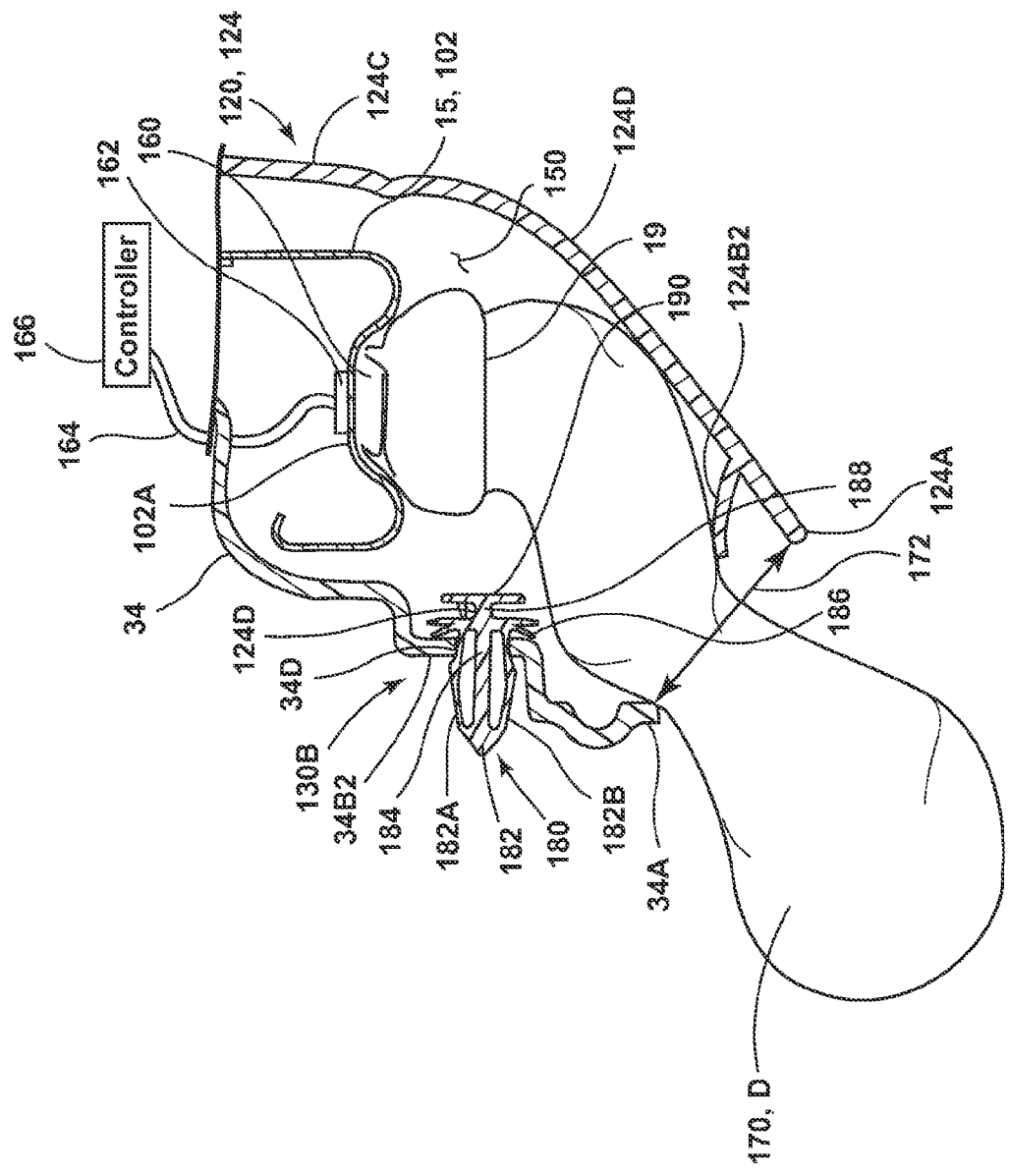
FIG. 7C is a cross-sectional top plan view of the coupling arrangement shown in FIG. 7B, showing an airbag in a deployed condition.

As shown in FIGS. 7A, 7B, the mounting member 34B2 is a substantially planar tab having a mounting aperture 34D disposed therethrough. Similarly, as best shown in FIG. 7B, mounting feature 124B2 of the second side member 124 of outer shell 120 includes a substantially planar tab having a mounting aperture 124E disposed therethrough. In assembly, the mounting aperture 34D of mounting member 34B2 is configured to align with mounting aperture 124E of mounting feature 124B2. A pin member 180 is shown having an expandable body portion 182 with spring members 182A and 182B. The pin member 180 further includes a first neck portion 184, an abutment portion 186, a second neck portion 188 and a head portion 190. The pin member 180 is inserted through the mounting aperture 124E of mounting feature 124B2 and further inserted through the mounting aperture 34D of mounting member 34B2 in assembly. As best shown in FIG. 7B, with the pin member 180 fully inserted, the first neck portion 184 is disposed in mounting aperture 34D of mounting member 34B2, and the second neck portion 188 is disposed in mounting aperture 124E of mounting feature 124B2. The abutment portion 186 abuts mounting member 34B2 and further abuts mounting feature 124B2 in assembly, as shown in FIG. 7B. As noted above, when a collision event is sensed by the vehicle controller 166, the airbag module 19 is configured to deploy the airbag 170 from the contained position C (FIG. 7B) to the deployed position D (FIG. 7C).

Referring now to FIG. 7C, the airbag 170 is deployed from airbag module 19 in a forward direction through the seam or mating joint J2 by acting on the coupling arrangement 130B of the pin member 180 and mounting member 34B2 and mounting feature 124B2, thereby moving one or both of the outer edge 34A of the second side member 34 of the seatback carrier 30 away from the outer edge 124A of second side member 124 of the outer shell 120. This movement causes the coupling arrangement 130B to release, thereby forming the peripheral gap 172 at mating joint J2. Thus, in a manner similar to that described above with reference to FIG. 6C, the coupling arrangement 130B releases under the pressure of the airbag 170, thereby making the coupling arrangement 130B a releasable coupling arrangement. The coupling arrangement 130B can be released by the pin member 180 being pulled from either mounting aperture 34D or 124E, so long as the peripheral gap 172 is formed and the airbag 170 can fully deploy.

Figure 8:
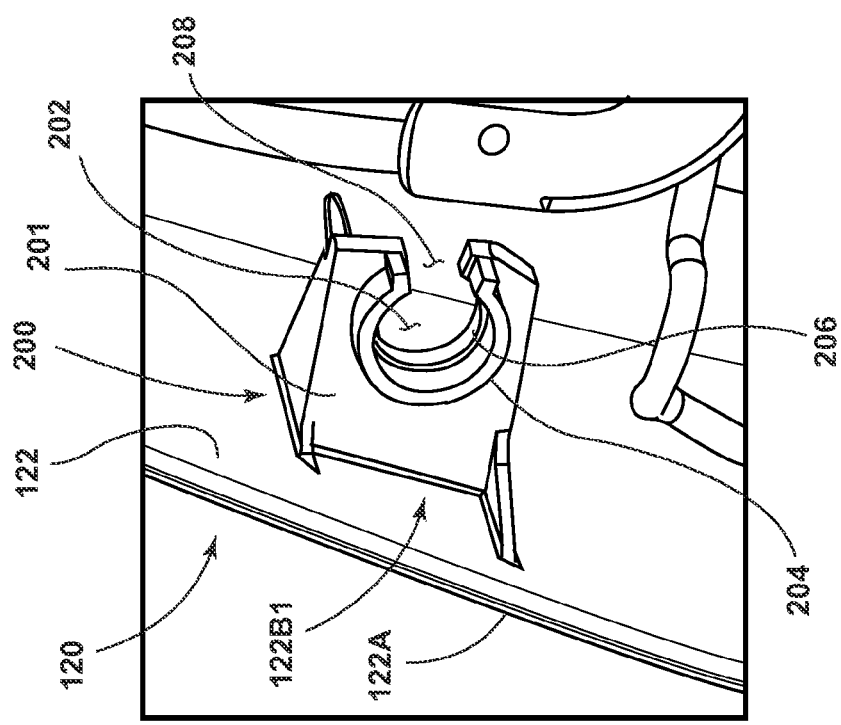
FIG. 8 is a perspective view of a molded-in retention clip disposed on a rear seatback module according to another embodiment of the present invention.

Referring now to FIG. 8, a portion of first side member 122 of the outer shell 120 is shown having mounting feature 122B1 disposed thereon. The mounting feature 122B1 is shown in the form of a molded-in retention clip 200 having a base portion 201 extending inwardly from the first side member 122 of the outer shell 120. As used herein, the term "molded-in" means that the subject part is cast or molded as a unitary part of the seatback carrier 30 or outer shell 120. A C-shaped mounting aperture 202 is formed in the base portion 201 at a distal end thereof, and includes a boss 204 extending outwardly therefrom. A relief portion 208, is defined at the distal most end of the C-shaped mounting aperture 202 and allows the C-shaped mounting aperture 202 to flex as needed for coupling and uncoupling the outer shell 120 to a corresponding seatback carrier 30, as further described below with reference to FIGS. 10A-10C.

Figure 9:
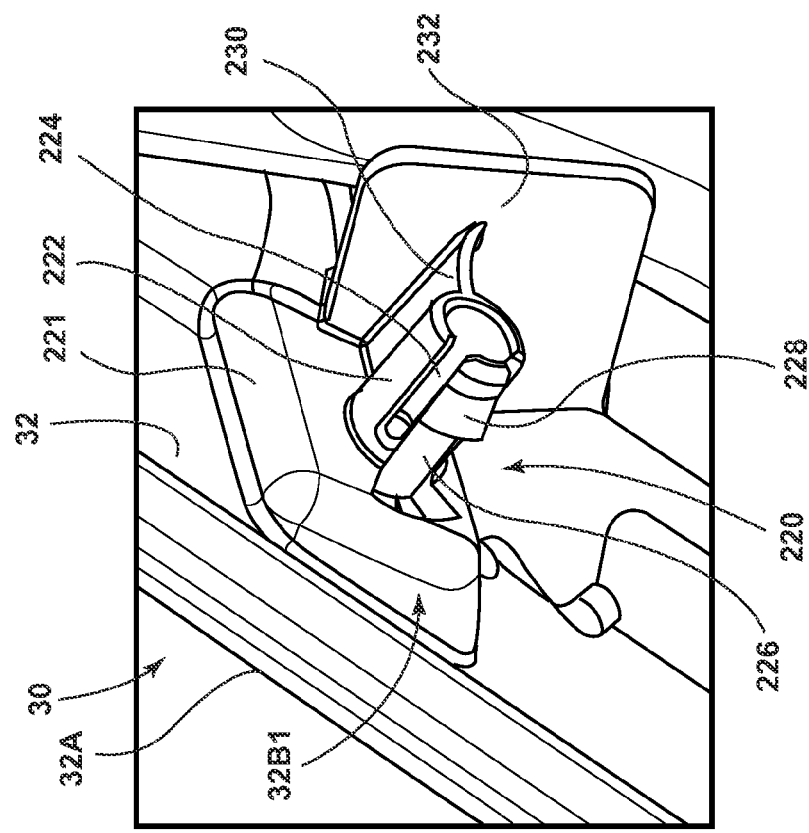
FIG. 9 is a perspective view of a molded-in retention pin disposed on a seatback carrier according to another embodiment of the present invention.

Referring now to FIG. 9, a portion of first side member 32 of the seatback carrier 30 is shown having mounting member 32B1 disposed thereon. The mounting member 32B1 is shown in the form of a molded-in retention pin 220 having a base portion 221 with a body portion 222 of the retention pin 220 extending in a car-rearward direction from the first side member 32 of the seatback carrier 30. The body portion 222 of the retention pin 220 is in the form of a column or hollow cylinder which includes a relief portion 224 in which a flexibly resilient spring finger 226 is disposed. The spring finger 226 includes a ramped abutment member 228 which is configured to abut a rear side 206 of the C-shaped mounting aperture 202 of the molded-in retention clip 200 of the outer shell 120 in assembly. The retention pin 220 further includes a mounting tab 230 extending outwardly from the body portion 222 which is further coupled to a reinforcement tab 232 disposed on the first side member 32 of the seatback carrier 30. In assembly, the body portion 222 of the retention pin 220 is received in the C-shaped mounting aperture 202 of the molded-in retention clip 200 of the outer shell 120. The flexibly resilient spring finger 226 is configured to flex as the body portion 222 of the retention pin 220 is received in the C-shaped mounting aperture 202 and is further configured to spring back into place when the ramped abutment member 228 clears the rear side 206 of the C-shaped aperture 202 of the molded-in retention clip 200. When the molded-in retention clip 200 and molded-in retention pin 220 are coupled together (FIG. 10A), the mounting tab 230 of the molded-in retention pin 220 is received through the relief portion 208 of the molded-in retention clip 200 of the outer shell 120.

Referring now to FIGS. 10A and 10B, a cross-sectional view of the seatback carrier 30 and outer shell 120 is shown, wherein the seatback carrier 30 is coupled to the outer shell 120 via another embodiment of a releasable coupling arrangement 130C around the seatback frame 15. In the embodiment shown in FIGS. 10A and 10B, the coupling arrangement 130C is located at mounting member 34B3 of the second side member 34 of the seatback carrier 30 and mounting feature 124B3 of the second side member 124 of the outer shell 120. It will be understood by one of ordinary skill that the mounting member 34B3 shown in FIGS. 10A and 10B is a corresponding mounting member to mounting member 32B1 shown in FIG. 9 and is further exemplary of the plurality of mounting members 32B, 34B disposed around the periphery of seatback carrier 30 (FIG. 2). Similarly, mounting feature 124B3 is a corresponding mounting feature to mounting feature 122B1 shown in FIG. 8, and is further exemplary of the plurality of mounting features 122B, 124B disposed around the periphery of the outer shell 120 as shown in FIG. 4. Like the releasable coupling arrangements 130A, 130B shown in FIGS. 6A-6C and 7A-7C, the releasable coupling arrangement 130C may be utilized at all the locations where mounting members 32B, 34B align with mounting features 122B, 124B as described above with reference to FIG. 5, or only at locations of the seatback assembly 13 (FIG. 1) adjacent an airbag module, such as airbag module 19.

As described above, and shown in FIGS. 10A, 10B, the mounting member 34B3 defines a molded-in retention pin 220. Further, mounting feature 124B3 of the second side member 124 of outer shell 120 defines a molded-in retention clip 200. The molded-in retention pin 220 of the seatback carrier 30 is received in the molded-in retention clip 200 of the outer shell 120 to define the releasable coupling arrangement 130C. The molded-in retention pin 220 of the seatback carrier 30 is fully received in the molded-in retention clip 200 of the outer shell 120 when the abutment member 228 of spring finger 226 clears the C-shaped aperture 202 of the molded-in retention clip 200 as shown in FIGS. 10A and 10B. In a similar manner as noted above, when a collision event is sensed by the vehicle controller 166, the airbag module 19 is configured to deploy the airbag 170 from the contained position C (FIG. 10B) to the deployed position D (FIG. 10C).

Figure 10C:
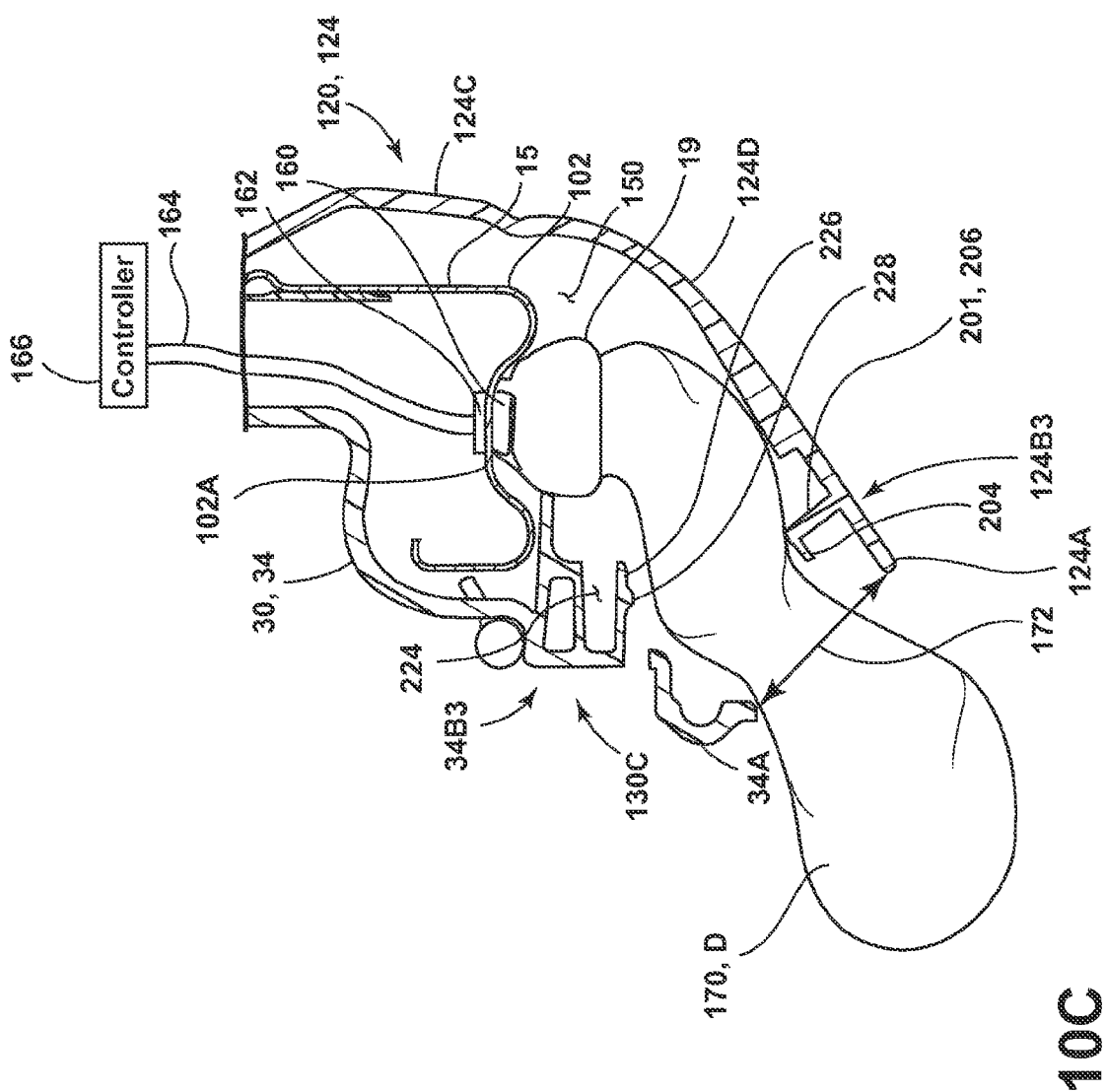
FIG. 10C is a cross-sectional top plan view of the coupling arrangement shown in FIG. 10B, showing an airbag in a deployed condition.

Referring now to FIG. 10C, the airbag 170 is deployed from airbag module 19 in a forward direction through the seam or mating joint J2 by acting on the releasable coupling arrangement 130C of the molded-in retention pin 220 of the seatback carrier 30 and the molded-in retention clip 200 of the outer shell 120, thereby moving one or both of the outer edge 34A of the second side member 34 of the seatback carrier 30 away from the outer edge 124A of second side member 124 of the outer shell 120. This movement causes the releasable coupling arrangement 130C to release, thereby forming the peripheral gap 172 at mating joint J2. Thus, in a manner similar to that described above with reference to FIGS. 6C and 7C, the releasable coupling arrangement 130C releases under the pressure of the airbag 170, thereby making the coupling arrangement 130C a releasable coupling arrangement. The coupling arrangement 130C can be released by the molded-in retention pin 220 of the seatback carrier 30 being pulled from the C-shaped aperture 202 of the molded-in retention clip 200 of the outer shell 120, thereby expanding the peripheral gap 172 such that the airbag 170 can fully deploy.

Thus, the releasable coupling arrangements 130A, 130B and 130C described above can take different forms, so long as the coupling arrangements 130A, 130B and 130C are capable of coupling the outer shell 120 to the seatback carrier 30, while still being releasable under the force of an airbag, such as airbag 170 of airbag module 19, to allow for proper and full deployment of the airbag 170 through the peripheral gap 172 formed between the outer shell 120 and the seatback carrier 30.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seatback assembly, comprising:
a rear seatback module defined by an outer shell having first and second side members;
one or more mounting features disposed on one of the first and second side members of the outer shell, wherein each of the one or more mounting features includes first and second mounting fins spaced-apart from one another;
a seatback carrier having first and second side members, wherein the first and second side members of the seatback carrier are configured to align with the first and second side members of the outer shell in assembly;
one or more mounting members disposed on one of the first and second side members of the seatback carrier, wherein the one or more mounting members disposed on the seatback carrier include substantially planar mounting tabs configured to align with the first and second mounting fins disposed on the outer shell in assembly;
a releasable coupling arrangement defined between the one or more mounting features disposed on the outer shell and the one or more mounting members disposed on the seatback carrier;
a seatback frame disposed between the outer shell and the seatback carrier; and
an airbag module coupled to the seatback frame, wherein the releasable coupling arrangement is configured to release upon deployment of the airbag module to disengage a portion of the outer shell from the seatback carrier along a mating joint formed therebetween.

2. The vehicle seatback assembly of claim 1, wherein the releasable coupling arrangement includes a clip member configured to releasably couple the substantially planar mounting tabs of the seatback carrier to the first and second mounting fins of the outer shell.

3. The vehicle seatback assembly of claim 1, wherein airbag module is a side-impact airbag module.

4. The vehicle seatback assembly of claim 1, wherein the airbag module is substantially concealed by the outer shell.

5. The vehicle seatback assembly of claim 1, wherein the first and second side members of the outer shell are configured to flex under a force imparted by the deployment of the airbag module to release the releasable coupling arrangement.

* * * * *